United States Patent
Saitou et al.

(10) Patent No.: US 10,916,768 B2
(45) Date of Patent: Feb. 9, 2021

(54) POSITIVE ELECTRODE ACTIVE MATERIAL FOR NONAQUEOUS ELECTROLYTE SECONDARY BATTERY AND NONAQUEOUS ELECTROLYTE SECONDARY BATTERY

(71) Applicant: Panasonic Intellectual Property Management Co., Ltd., Osaka (JP)

(72) Inventors: Motoharu Saitou, Hyogo (JP); Yoshinori Aoki, Hyogo (JP); Takeshi Ogasawara, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 48 days.

(21) Appl. No.: 16/086,745

(22) PCT Filed: Feb. 13, 2017

(86) PCT No.: PCT/JP2017/005050
§ 371 (c)(1),
(2) Date: Sep. 20, 2018

(87) PCT Pub. No.: WO2017/169184
PCT Pub. Date: Oct. 5, 2017

(65) Prior Publication Data
US 2019/0103605 A1 Apr. 4, 2019

(30) Foreign Application Priority Data

Mar. 30, 2016 (JP) ................. 2016-068883

(51) Int. Cl.
| | |
|---|---|
| *H01M 4/36* | (2006.01) |
| *H01M 4/134* | (2010.01) |
| *H01M 4/131* | (2010.01) |
| *H01M 10/05* | (2010.01) |
| *H01M 4/525* | (2010.01) |
| *H01M 4/38* | (2006.01) |
| *H01M 4/02* | (2006.01) |

(52) U.S. Cl.
CPC .......... *H01M 4/366* (2013.01); *H01M 4/131* (2013.01); *H01M 4/134* (2013.01); *H01M 10/05* (2013.01); *H01M 4/386* (2013.01); *H01M 4/525* (2013.01); *H01M 2004/021* (2013.01); *H01M 2004/028* (2013.01)

(58) Field of Classification Search
None
See application file for complete search history.

(56) References Cited

U.S. PATENT DOCUMENTS

| | | |
|---|---|---|
| 2006/0292446 A1 | 12/2006 | Kweon et al. |
| 2009/0081550 A1 | 3/2009 | Inoue et al. |
| 2015/0060725 A1 | 3/2015 | Yamamoto et al. |
| 2015/0221934 A1 | 8/2015 | Hiratsuka et al. |
| 2016/0372748 A1 | 12/2016 | Nakayama et al. |
| 2017/0054147 A1 | 2/2017 | Yokoyama et al. |
| 2017/0324090 A1 | 11/2017 | Ryoshi et al. |

FOREIGN PATENT DOCUMENTS

| | | |
|---|---|---|
| CN | 104821393 A | 8/2015 |
| JP | 11-162465 A | 6/1999 |
| JP | 2000-353526 A | 12/2000 |
| JP | 2004-335152 A | 11/2004 |
| JP | 2005-325000 A | 11/2005 |
| JP | 2009-76383 A | 4/2009 |
| JP | 2011-124086 A | 6/2011 |
| JP | 2013-211239 A | 10/2013 |
| JP | 2015-64977 A | 4/2015 |
| JP | 2015-164119 A | 9/2015 |
| JP | 2015-164123 A | 9/2015 |
| WO | 2015/008582 A1 | 1/2015 |
| WO | 2015/163273 A1 | 10/2015 |
| WO | 2016/068263 A1 | 5/2016 |

OTHER PUBLICATIONS

International Search Report dated Mar. 14, 2017, issued in counterpart International Application No. PCT/JP2017/005050 (2 pages).
Suzuki et al., "Development of positive electrode material for a lithium ion secondary battery using a first-principle calculation", The 83rd ECSJ Spring Meeting, Mar. 29, 2016, with English Translation; Cited in JP Office Action dated Jul. 10, 2020. (22 pages).
English Translation of Chinese Search Report dated Oct. 28, 2020, issued in counterpart CN Application No. 201780018127.8. (2 pages).

*Primary Examiner* — Sarah A. Slifka
(74) *Attorney, Agent, or Firm* — Westerman, Hattori, Daniels & Adrian, LLP

(57) ABSTRACT

A positive electrode active material for a nonaqueous electrolyte secondary battery contains silicon and lithium nickel complex oxide having a layered rock-salt structure and is composed of secondary particles formed of aggregated primary particles. Lithium nickel complex oxide contains 80 mol % or more of nickel, based on the total amount of metal excluding lithium, silicon content is 0.6 mass % or less based on the total amount of the positive electrode active material, and a porosity of the positive electrode active material is 0% or more and 1% or less.

5 Claims, 3 Drawing Sheets

POSITIVE ELECTRODE ACTIVE MATERIAL FOR NONAQUEOUS ELECTROLYTE SECONDARY BATTERY AND NONAQUEOUS ELECTROLYTE SECONDARY BATTERY

TECHNICAL FIELD

The present disclosure relates to a positive electrode active material for a nonaqueous electrolyte secondary battery and to a nonaqueous electrolyte secondary battery.

BACKGROUND ART

Lithium nickel complex oxide ($LiNiO_2$), which is a positive electrode material for a lithium-ion secondary battery, has advantages over lithium cobalt complex oxide ($LiCoO_2$), such as high capacity and stable availability of nickel due to having a lower cost than cobalt. Accordingly, lithium nickel complex oxide is anticipated as a next-generation positive electrode material. Lithium nickel complex oxide, however, generally has less durability compared with lithium cobalt complex oxide. Therefore, efforts have been made to improve the durability of lithium nickel complex oxide.

Patent Literature 1 describes an invention directed toward a positive electrode active material for a nonaqueous electrolyte secondary battery including primary particles of lithium nickel complex oxide and secondary particles formed as aggregates of the primary particles, where the primary particles have fine particles containing W and Li on the surfaces, the c-axis length of the lithium nickel complex oxide is in a specific range, and a porosity measured in sectional observation of the secondary particles is 0.5 to 4%.

CITATION LIST

Patent Literature

PTL 1: International Publication No. 2015/163273

SUMMARY OF INVENTION

Meanwhile, lithium-ion secondary batteries find use in the field of electricity storage, and further durability performance is required for lithium-ion secondary batteries usable in such a field. Accordingly, there is a need for a nonaqueous electrolyte secondary battery having further enhanced durability relative to a nonaqueous electrolyte secondary battery using conventional nickel-excess lithium nickel complex oxide.

An object of the present disclosure is to provide a nonaqueous electrolyte secondary battery that has a positive electrode including a positive electrode active material containing nickel-excess lithium nickel complex oxide and that exhibits further enhanced durability.

A positive electrode active material for a nonaqueous electrolyte secondary battery according to the present disclosure contains silicon and lithium nickel complex oxide having a layered rock-salt structure and is composed of secondary particles formed of aggregated primary particles. Lithium nickel complex oxide contains 80 mol % or more of nickel, based on the total amount of metal excluding lithium, silicon content is 0.6 mass % or less based on the total amount of the positive electrode active material, and a porosity of the positive electrode active material is 0% or more and 1% or less.

According to the present disclosure, a nonaqueous electrolyte secondary battery that has a positive electrode including a positive electrode active material containing nickel-excess lithium nickel complex oxide and that exhibits further enhanced durability can be manufactured.

DESCRIPTION OF EMBODIMENTS

Figure 1:
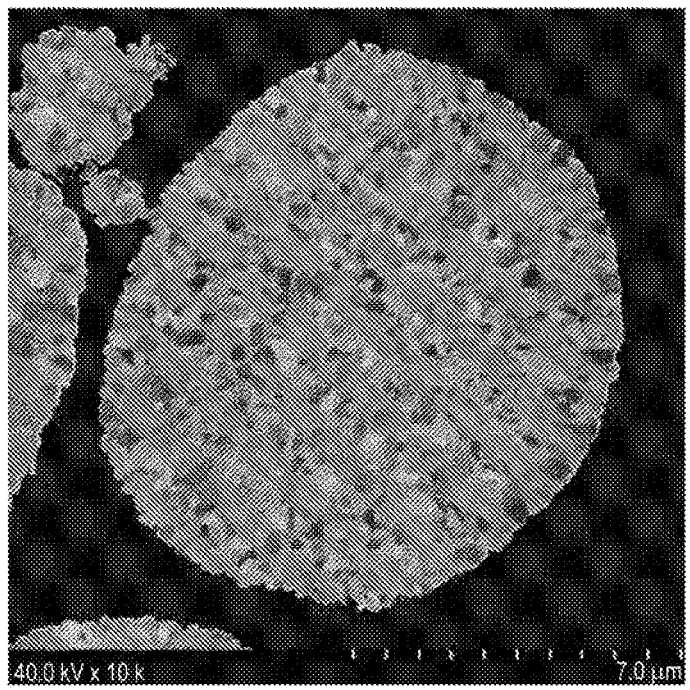
FIG. 1 shows a SIM image of a positive electrode active material prepared in Example 1.
Figure 2:
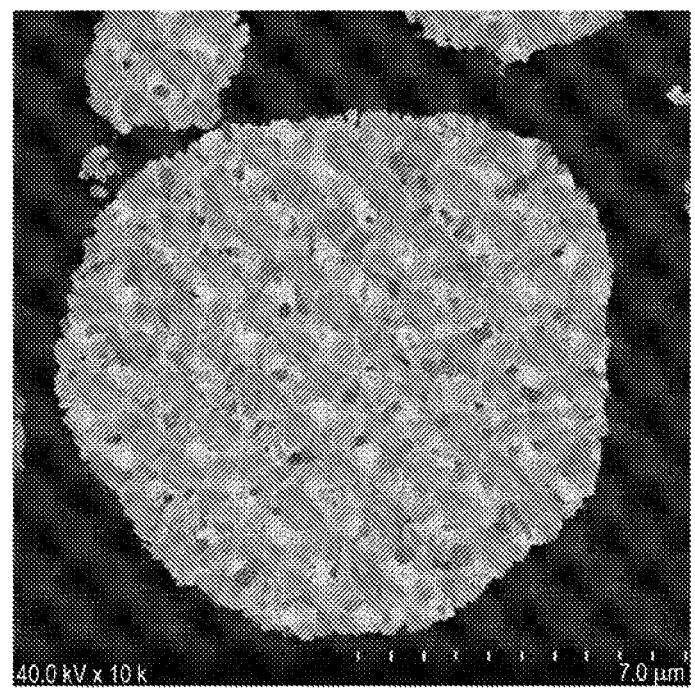
FIG. 2 shows a SIM image of a positive electrode active material prepared in Example 2.
Figure 3:
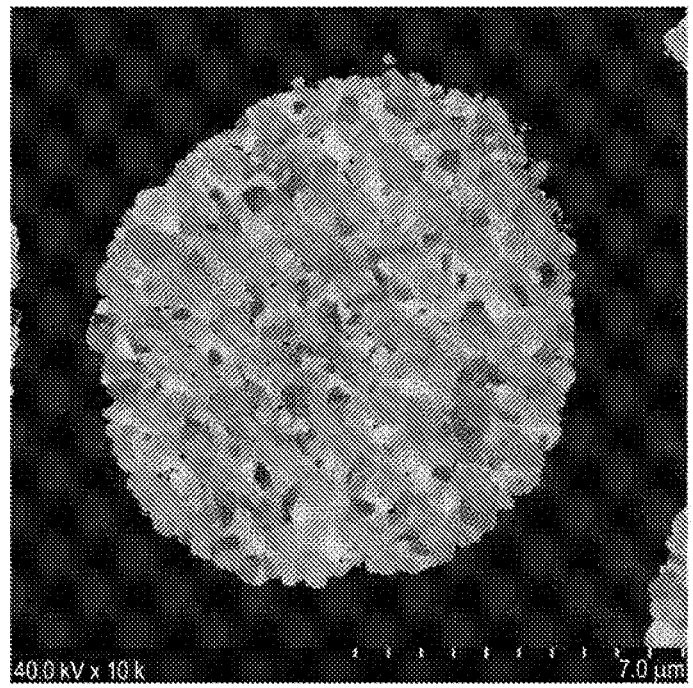
FIG. 3 shows a SIM image of a positive electrode active material prepared in Comparative Example 1.
Figure 4:
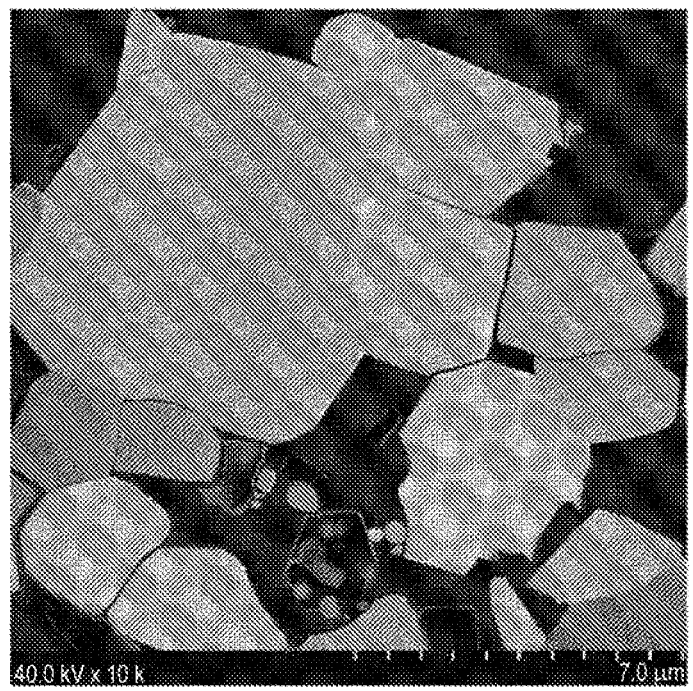
FIG. 4 shows a SIM image of a positive electrode active material prepared in Comparative Example 2.
Figure 5:
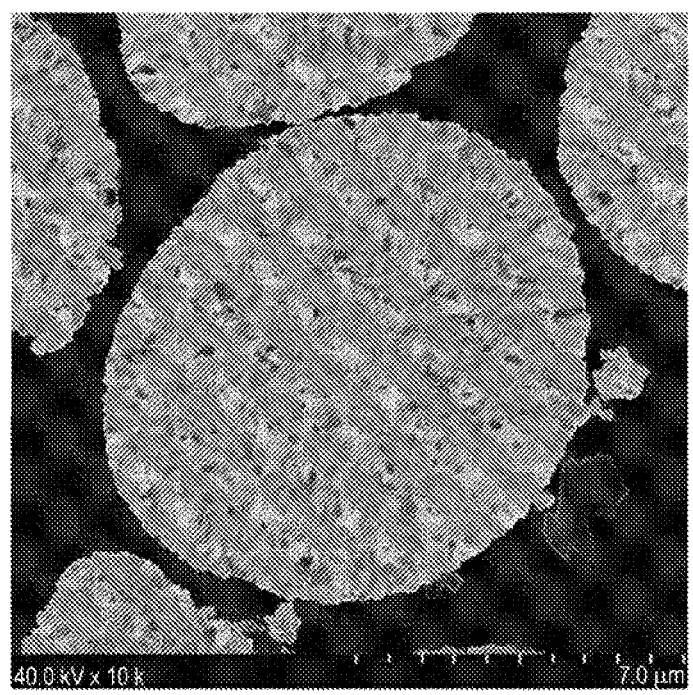
FIG. 5 shows a SIM image of a positive electrode active material prepared in Comparative Example 3.

As a method of improving durability of a nonaqueous electrolyte secondary battery, it is possible to minimize voids inside a positive electrode active material in order to decrease a contact area between the positive electrode active material and a nonaqueous electrolyte. When a positive electrode active material containing lithium nickel complex oxide is manufactured by a common manufacturing method, however, such a positive electrode active material is composed of secondary particles formed of aggregated primary particles having a small particle size. Accordingly, in some cases, voids are formed in connecting regions (grain boundaries) of the primary particles, and thus a difficulty arises in decreasing voids inside the positive electrode active material.

As the result of intensive studies, the present inventors found that a positive electrode active material having a low porosity can be prepared by incorporating silicon, together with nickel-excess lithium nickel complex oxide, into the positive electrode active material, and consequently, a nonaqueous electrolyte secondary battery having further enhanced durability can be manufactured.

Hereinafter, an exemplary embodiment of the present disclosure will be described in detail.

A nonaqueous electrolyte secondary battery (hereinafter, also simply referred to as a "secondary battery") of an exemplary embodiment of the present disclosure includes a positive electrode, a negative electrode, and a nonaqueous electrolyte. A separator is preferably provided between the positive electrode and the negative electrode. Such a nonaqueous electrolyte secondary battery, for example, has a structure in which a nonaqueous electrolyte and a rolled electrode assembly formed by rolling a positive electrode and a negative electrode with a separator in between are held in a case. Alternatively, in place of the rolled electrode assembly, other types of electrode assembly, such as a stacked electrode assembly formed by stacking positive electrodes and negative electrodes with separators in between, may be employed. Moreover, types of nonaqueous electrolyte secondary battery are not specifically limited, and the examples include a cylindrical type, a prismatic type, a coin type, a button type, and a laminate type.

[Positive Electrode]

A positive electrode is composed of a positive electrode current collector formed of a metal foil, for example, and a positive electrode active material layer formed on the positive electrode current collector. A metal foil of aluminum or the like, which is stable in the potential range of the positive electrode, and a film having such metal arranged as a surface layer, for example, may be used for the positive electrode current collector. In addition to the positive electrode active material, the positive electrode active material layer preferably contains a conductive agent and a binder. The conductive agent is used to enhance electric conductivity of the positive electrode active material layer.

Examples of the conductive agent include carbon materials, such as carbon black, acetylene black, Ketjen black, and graphite. The carbon materials may be used alone or in a combination of two or more. The content of the conductive agent is preferably 0.1 to 30 mass %, more preferably 0.1 to 20 mass %, and particularly preferably 0.1 to 10 mass % based on the total amount of the positive electrode active material layer.

The binder is used to maintain a good contact state between the positive electrode active material and the conductive agent, and to enhance binding properties of the positive electrode active material and the like when binding to the positive electrode current collector surface. Examples of the binder include polytetrafluoroethylene (PTFE), polyvinylidene fluoride, polyvinyl acetate, polymethacrylates, polyacrylates, polyacrylonitrile, polyvinyl alcohol, and two or more mixtures thereof. The binder may be used together with a thickening agent, such as carboxymethyl cellulose (CMC) or polyethylene oxide (PEO). The thickening agent may be used alone or in a combination of two or more. The content of the binder is preferably 0.1 to 30 mass %, more preferably 0.1 to 20 mass %, and particularly preferably 0.1 to 10 mass % based on the total amount of the positive electrode active material layer.

The positive electrode of a secondary battery according to the embodiment can be manufactured, for example, by applying a slurry containing a positive electrode active material, a conductive agent, a binder, and the like to one surface or both surfaces of a positive electrode current collector, drying the resulting coating(s), and then compressing (rolling) the dried coating(s) to form a positive electrode active material layer.

[Positive Electrode Active Material]

Hereinafter, a positive electrode active material will be described in detail.

A positive electrode active material usable for a nonaqueous electrolyte secondary battery as an exemplary embodiment of the present disclosure (also simply referred to as a "positive electrode active material") contains lithium nickel complex oxide and silicon. The positive electrode active material is composed of secondary particles formed of aggregated primary particles and has a layered rock-salt structure.

The positive electrode active material contains lithium nickel complex oxide as a main component. The expression "contains as a main component" herein means that the content of lithium nickel complex oxide is, for example, 90 mass % or more and preferably 99% or more based on the total amount of the positive electrode active material.

Lithium nickel complex oxide contains at least lithium (Li) and nickel (Ni), and nickel is contained at 80 mol % or more based on the total amount of metal excluding lithium. Hereinafter, lithium nickel complex oxide contained in the positive electrode active material according to the present disclosure is also simply referred to as a "complex oxide". The content of lithium in the complex oxide is preferably 90 mol % or more and 1.05 mol % or less, for example. By incorporating lithium in this range, the charge/discharge capacity of a nonaqueous electrolyte secondary battery can be enhanced.

As mentioned above, the complex oxide contains 80 mol % or more of nickel, based on the total amount of metal excluding lithium. By incorporating nickel in this range into the complex oxide, basic durability of a nonaqueous electrolyte secondary battery is enhanced. The complex oxide preferably contains 85 mol % or more and 95 mol % or less of nickel, based on the total amount of metal excluding lithium.

The complex oxide can be represented by a general formula of $Li_xNi_yM_zO_2$, for example. In the formula, M represents a metal element excluding lithium and nickel, and x, y, and z satisfy $0.90 \leq x \leq 1.05$, $0.8 \leq y \leq 1$, $0 \leq z \leq 0.2$, and $y+z=1$.

The metal element M in the above general formula may be at least one metal element selected from transition metal elements, alkaline earth elements, and group 12 to 14 elements, for example. Specific examples of the metal element M include cobalt (Co), aluminum (Al), magnesium (Mg), calcium (Ca), chromium (Cr), zirconium (Zr), molybdenum (Mo), silicon (Si), titanium (Ti), and iron (Fe).

In view of durability of a nonaqueous electrolyte secondary battery, the complex oxide preferably contains cobalt and more preferably contains cobalt, for example, in an amount of 3 mol % or more and 15 mol % or less based on the total amount of metal excluding lithium (Ni and M in the above general formula).

The complex oxide preferably contains aluminum and preferably contains aluminum, for example, in an amount of 1 mol % or more and 5 mol % or less based on the total amount of metal excluding lithium (Ni and M in the above general formula). By incorporating aluminum into the complex oxide, durability of a nonaqueous electrolyte secondary battery can be enhanced. Further, by incorporating aluminum in an amount of 5 mol % or less, the charge/discharge capacity of a nonaqueous electrolyte secondary battery can be enhanced.

The complex oxide is preferably free of manganese (Mn). When the complex oxide contains manganese, durability of a secondary battery is decreased in some cases.

The complex oxide represented by the above general formula is not necessarily limited to a complex oxide in which a molar ratio of the total amount of nickel and the metal element M to oxygen atoms is exactly 1:2. For example, even a complex oxide having the molar ratio of 1:1.9 to 1:2.1 can be regarded as being included in the complex oxide represented by the above general formula.

The positive electrode active material contains silicon (Si) in an amount of 0.6 mass % or less based on the total amount of the positive electrode active material (total amount of lithium nickel complex oxide and silicon). Silicon may be contained in any form in the positive electrode active material, but is preferably dissolved in the complex oxide. When silicon is dissolved in the complex oxide, bonding between silicon and oxygen is strengthened, and thus the crystal lattice can be reinforced, thereby enhancing durability. The complex oxide, in which silicon is dissolved, corresponds to a compound represented by the above general formula of $Li_xNi_yM_zO_2$ where M contains silicon.

Silicon contained in the positive electrode active material may be present as a silicon compound in connecting regions (grain boundaries) of primary particles. Examples of the silicon compound include silicon oxide, such as $SiO_2$ or $SiO$, and lithium silicate, which is an oxide of lithium and silicon.

The positive electrode active material according to the embodiment can enhance durability of a secondary battery by incorporating silicon in the above range. The positive electrode active material exhibits cracking, breakage, or the like when the volume of primary particles varies with expanding/contracting of the crystal lattice during charging/discharging, thereby causing stress inside the respective secondary particles. It is believed, however, that the presence of silicon in the positive electrode active material results in a small primary particle size of the complex oxide, thereby decreasing stress inside the respective secondary particles during charging/discharging, and consequently cracking, breakage, or the like of the positive electrode active material is suppressed.

The positive electrode active material, provided that silicon is contained therein, is considered to be effective in enhancing durability of a secondary battery, as described above. The lower limit of silicon content in the positive electrode active material is not specifically limited, but is preferably 0.01 mass % or more based on the total amount of the positive electrode active material since the crystal lattice is reinforced.

The positive electrode active material according to the embodiment has silicon content of 0.6 mass % or less based on the total amount of the positive electrode active material. When silicon content exceeds the above range, durability of a secondary battery is decreased. Although the reason is not clear, ion exchange between nickel and lithium presumably destabilizes a layered rock-salt structure. In view of the above, silicon content in the positive electrode active material is more preferably 0.2 mass % or less based on the total amount of the positive electrode active material.

The composition of a complex oxide usable as the positive electrode active material can be measured by using an ICP atomic emission spectrometer (trade name "iCAP6300" from Thermo Fisher Scientific Inc., for example).

The structure of the positive electrode active material will be described in detail. The positive electrode active material has a layered rock-salt structure. The layered rock-salt structure is a crystal structure in which lithium layers and layers of metal excluding lithium are alternately stacked with oxygen atom layers in between. Examples of the layered rock-salt structure include crystal structures belonging to space group R-3m. Examples of compounds having such a layered rock-salt structure include lithium nickel oxide ($LiNiO_2$) and lithium nickel cobalt oxide ($LiCoO_2$). The complex oxide represented by the above general formula is also considered to have a layered crystal structure.

Whether the positive electrode active material has a layered rock-salt structure can be determined by analysis using a commonly known method based on powder X-ray diffraction. The presence of a layered rock-salt structure is confirmed, for example, by detecting (101) and (104) diffraction peaks of the layered rock-salt structure that appear at diffraction angles (2θ) near 36.6° and near 44.4°, respectively, in the X-ray diffraction pattern of the positive electrode active material.

The positive electrode active material is composed of secondary particles formed of aggregated primary particles of the above-described lithium nickel complex oxide. The particle size of the secondary particles is preferably 1 μm or more and 20 μm or less, for example. The particle size of the secondary particles can be obtained as an average particle size for 100 particles, for example, by observing secondary particles by using a scanning electron microscope (SEM) or a scanning ion microscope (SIM), randomly extracting 100 particles, and setting an average value of the major axis and the minor axis of each particle as a particle size thereof.

The positive electrode active material has a porosity of 1% or less. The term "porosity" of the positive electrode active material herein denotes a fraction of existing void portions where primary particles are absent inside the positive electrode active material, which is measured in sectional observation of the positive electrode active material. When the porosity of the positive electrode active material is excessively high, a nonaqueous electrolyte solution which has infiltrated voids undergoes side reactions at the positive electrode interface, thereby forming bulky deposits inside secondary particles. It is believed that cracking, breakage, or the like of secondary particles results from such deposit formation, thereby decreasing durability of a secondary battery.

In contrast, the positive electrode active material according to the embodiment, which has few internal voids and is composed of secondary particles formed of closely aggregated primary particles, suppresses infiltration of a nonaqueous electrolyte solution into secondary particles during use in a secondary battery. Consequently, it is believed that durability of a secondary battery can be enhanced by suppressing formation of bulky deposits inside secondary particles, and thereby suppressing cracking, breakage, or the like of secondary particles. In view of the above, the porosity of the positive electrode active material is preferably closer to 0% and is preferably 0.2% or less and further, 0.05% or less, for example. The porosity of the positive electrode active material may be 0%, in other words, equal to or lower than the detection limit.

A measurement method for the porosity of the positive electrode active material by sectional observation is as follows, for example. First, a thin piece (7 mm-square with a thickness of about 1 mm) is prepared by mixing a positive electrode active material and a thermosetting resin, curing the resin, and polishing the cured product mechanically.

The thin piece then undergoes finish sectional processing by a cross section polisher (CP) method, and the polished surface is observed under a scanning ion microscope (SIM) at a magnification of 1,000× to 10,000×. FIGS. 1 to 6 each show a specific example of an image observed by using a SIM of the section of a positive electrode active material. From the obtained sectional image, a porosity of the positive electrode active material is calculated by using analysis software (trade name "Image-Pro PLUS" from Media Cybernetics, Inc., for example). More specifically, a porosity of the positive electrode active material is obtained as an area ratio of void portions to the entire positive electrode active material by color-coding void portions and non-void portions inside secondary particles and obtaining areas of the respective portions.

The complex oxide usable as a positive electrode active material according to the embodiment can be synthesized, for example, by mixing nickel, a lithium compound, such as lithium hydroxide, an oxide of a metal element excluding lithium and nickel, such as M of the above general formula, and silicon compound at a mixing ratio based on an intended complex oxide, and calcining the resulting mixture. The calcination of the mixture is performed in air or under a stream of oxygen. A calcination temperature is about 600° C. to 1,100° C., and a calcination time is about 1 to 10 hours at a calcination temperature of 600° C. to 1,100° C.

The positive electrode active material having a low porosity according to the embodiment can be realized by incorporating silicon into the positive electrode active material. Short-time calcination, however, is also important in preparation of a positive electrode active material having a low porosity. Although the reason is not clear, a smaller primary particle size presumably enables preparation of a positive electrode active material having a lower porosity.

The hardness of the positive electrode active material is determined by the degree of proximity of primary particles and the strength of primary particles. The hardness of the positive electrode active material can be evaluated in terms of compressive fracture strength. Compressive fracture strength (St) is calculated in accordance with an expression of $St=2.8P/(\pi d^2)$ where P represents a load on particles and d represents a particle size, which is described in the "Journal of the Mining and Metallurgical Institute of Japan" (vol. 81, issue No. 932, pages 1,024 to 1,030, December, 1965). Compressive fracture strength is highly dependent on particle size since compressive fracture strength is divided by the square of particle size and thus becomes higher for smaller particles. Accordingly, compressive fracture strength is preferably specified at a predetermined particle size.

The positive electrode active material preferably has a compressive fracture strength of 130 MPa or higher and 230 MPa or lower at a specified particle size of about 8 μm. The phrase "particle size of about 8 μm" herein denotes a particle size in the range of 8 μm±≤5%, for example. When a compressive fracture strength is lower than 130 MPa, durability of a secondary battery is decreased in some cases, whereas when a compressive fracture strength exceeds 230 MPa, a metal foil for a positive electrode current collector is damaged by compression (rolling) during the manufacture of a positive electrode in some cases. The compressive fracture strength of a positive electrode active material can be measured, for example, by using a micro compression tester (model name "MCT-W201" from Shimadzu Corporation).

Secondary particles of a positive electrode active material are preferably formed through aggregation of many primary particles having a smaller particle size. When a primary particle size is small and a large number of primary particles are contained in secondary particles, stress due to volume changes arising from lattice expanding/contracting during charging/discharging of a secondary battery can be decreased, thereby enhancing durability of the secondary battery.

In view of the above, the positive electrode active material preferably has an average number of primary particles contained in secondary particles, whose diameter is converted to be 8 μm, of 10,000 or more. When the average number of primary particles is less than 10,000, it is believed that cracking of the positive electrode active material results due to volume changes arising from lattice contraction, thereby decreasing durability in some cases. Meanwhile, the average number of primary particles contained in secondary particles, whose diameter is converted to be 8 μm, is preferably 4,000,000 or less. When the average number of primary particles exceeds 4,000,000, the primary particle size, the composition, and the like do not become uniform, and consequently, battery characteristics are impaired in some cases.

Figure 6:
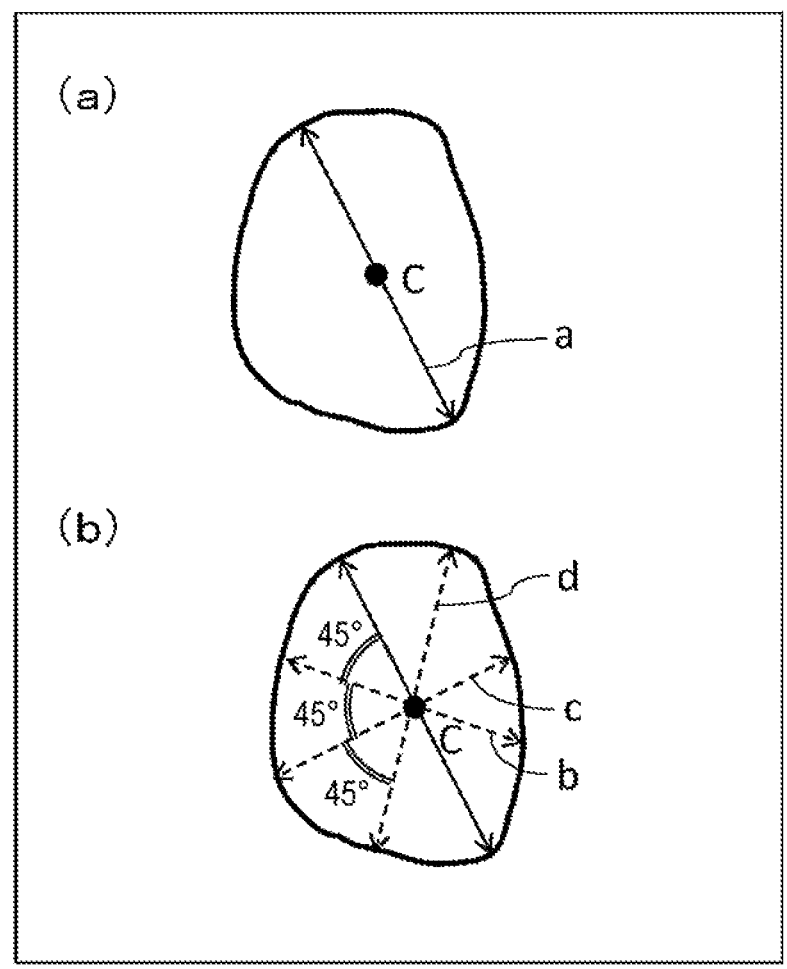
FIG. 6 illustrates a measurement method for an average particle size of primary particles.

A measurement method for an average primary particle size will be described with reference to FIG. 6. FIG. 6 is a schematic view of an image of a secondary particle observed under a scanning ion microscope (SIM). In the observed image of the secondary particle, a longest line segment a having the both ends on the surface of the secondary particle is drawn (see FIG. 6 (a)). The length of the line segment a is the maximum particle size (diameter) of the secondary particle. A point bisecting the line segment a is set as a center C. Three line segments b, c, and d having the both ends on the surface of the secondary particle are drawn at angles of 45°, 90°, and 135°, respectively, from the line segment a so as to pass through the center C (see FIG. 6 (b)). The lengths of the line segments a, b, c, and d ($r_a$, $r_b$, $r_c$, $r_d$), and the number of primary particles crossed by each line segment ($n_a$, $n_b$, $n_c$, $n_d$) are measured. Subsequently, a particle size for one primary particle is obtained in accordance with $R_a=r_a/n_a$, $R_b=r_b/n_b$, $R_c=r_c/n_c$, and $R_d=r_d/n_d$ for the respective line segments. After a maximum value and a minimum value are removed, an average value of the remaining two particle sizes is set as a primary particle size of the measured secondary particle. For each of randomly selected 10 secondary particles, a primary particle size is measured in the similar manner, and an average primary particle size Rp is obtained by averaging the measured values.

In the calculation of an average number of primary particles contained in secondary particles, primary particles and secondary particles are assumed as spheres, and void portions inside secondary particles are deemed negligibly small. Since the volume of a sphere is proportional to the cube of the diameter, an average number N of primary particles contained in secondary particles is represented as $N=Rs^3/Rp^3$ where Rs is an average secondary particle size. The average number N of primary particles contained in secondary particles, when the diameter of the secondary particles is converted to be 8 μm, can be obtained on the basis of the above equation and the average primary particle size Rp measured by the above-described method.

[Negative Electrode]

A negative electrode includes a negative electrode current collector formed of a metal foil, for example, and a negative electrode active material layer formed on the surface of the negative electrode current collector. A metal foil of aluminum, copper, or the like, which is stable in the potential range of the negative electrode, and a film having such metal arranged as a surface layer, for example, may be used for the negative electrode current collector. The negative electrode active material layer preferably contains a binder, in addition to a negative electrode active material that can adsorb/desorb lithium ions. Further, a conductive agent may be contained as necessary.

Examples of the negative electrode active material include natural graphite, artificial graphite, lithium, silicon, carbon, tin, germanium, aluminum, lead, indium, gallium, lithium alloys, lithiated carbon and silicon, alloys thereof, and mixtures thereof. Preferably, carbon materials, such as natural graphite, artificial graphite, carbon, and lithiated carbon, are preferably contained. Although PTFE, for example, can also be used as a binder similar to the case of a positive electrode, styrene-butadiene copolymer (SBR) or modified SBR, for example, is preferably used. The binder may be used together with a thickening agent, such as CMC.

[Nonaqueous Electrolyte]

A nonaqueous electrolyte contains a nonaqueous solvent and an electrolyte salt dissolved in the nonaqueous solvent. The nonaqueous electrolyte is not limited to a liquid electrolyte (nonaqueous electrolyte solution) and may be a solid electrolyte using a gel polymer, for example. Examples of the nonaqueous solvent include esters; ethers; nitriles, such as acetonitrile; amides, such as dimethylformamide; and mixed solvents of two or more thereof.

Examples of the esters include cyclic carbonate esters, such as ethylene carbonate, propylene carbonate, and butylene carbonate; linear carbonate esters, such as dimethyl carbonate, methyl ethyl carbonate, diethyl carbonate, methyl propyl carbonate, ethyl propyl carbonate, and methyl isopropyl carbonate; and carboxylic acid esters, such as methyl acetate, ethyl acetate, propyl acetate, methyl propionate, ethyl propionate, and γ-butyrolactone.

Examples of the ethers include cyclic ethers, such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineol, and crown ethers; and linear ethers, such as 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl ether.

The nonaqueous solvents preferably include halogenated solvents, in which hydrogen of the above-mentioned various solvents is replaced with halogen atoms, such as fluorine. In particular, a fluorinated cyclic carbonate ester and a fluorinated linear carbonate ester are preferred, and more preferably both of them are mixed and used. Their use results in the formation of a good protective coating on a positive electrode in addition to a negative electrode, thereby improving cycle characteristics. Preferred examples of the fluorinated cyclic carbonate ester include 4-fluoroethylene carbonate, 4,5-difluoroethylene carbonate, 4,4-difluoroethylene carbonate, 4,4,5-trifluoroethylene carbonate, and 4,4,5,5-tetrafluoroethylene carbonate. Preferred examples of the fluorinated linear ester include ethyl 2,2,2-trifluoroacetate, methyl 3,3,3-trifluoropropionate, and methyl pentafluoropropionate.

The electrolyte salt is preferably a lithium salt. Examples of the lithium salt include $LiPF_6$, $LiBF_4$, $LiAsF_6$, $LiClO_4$, $LiCF_3SO_3$, $LiN(FSO_2)_2$, $LiN(C_lF_{2l+1}SO_2)(C_mF_{2m+1}SO_2)$ (1 and m each represent an integer of 1 or more), $LiC(C_pF_{2p+1}SO_2)(C_qF_{2q+1}SO_2)(C_rF_{2r+1}SO_2)$ (p, q, and r each represent an integer of 1 or more), $Li[B(C_2O_4)_2]$ (lithium bis(oxalato)borate (LiBOB)), $Li[B(C_2O_4)F_2]$, $Li[P(C_2O_4)F_4]$, $Li[P(C_2O_4)_2F_2]$, and $LiPO_2F_2$. Such a lithium salt may be used alone or in a combination of two or more.

[Separator]

An ion-permeable insulating porous sheet is used as a separator. Specific examples of the porous sheet include a microporous membrane, a woven fabric, and a nonwoven fabric. As a material for the separator, an olefin resin, such as polyethylene or polypropylene, and cellulose, for example, are preferred. The separator may be a layered structure including a cellulose fiber layer and a thermoplastic resin fiber layer formed of an olefin resin, for example.

EXAMPLES

Hereinafter, the present disclosure will be further specifically described with Examples. The present disclosure, however, is not limited to the following Examples.

Example 1

[Preparation of Positive Electrode Active Material (Lithium Nickel Complex Oxide)]

NiCoAl complex oxide was prepared after obtaining nickel cobalt aluminum complex hydroxide represented by a composition formula of $Ni_{0.88}Co_{0.09}Al_{0.03}(OH)_2$ through coprecipitation. Subsequently, LiOH and NiCoAl complex oxide were mixed in the respective amounts such that a molar ratio of Li to total metal excluding Li (Ni, Co, Al) became 1.03:1. Further, SiO was added to the resulting mixture in an amount of 0.2 mass % as Si relative to the expected composition of a positive electrode active material ($Li_{1.03}Ni_{0.88}Co_{0.09}Al_{0.03}O_2$). After that, the mixture was calcined under a stream of oxygen at 750° C. for 10 hours to yield a positive electrode active material A1. The composition of the positive electrode active material A1 was determined by using an ICP atomic emission spectrometer (trade name "iCAP6300" from Thermo Fisher Scientific Inc.). As the result, the positive electrode active material A1 was a complex oxide represented by a composition formula of $Li_{1.03}Ni_{0.88}Co_{0.09}Al_{0.03}O_2$ and contained 0.19 mass % of Si, based on the total amount of the positive electrode active material A1.

The crystal structure of the positive electrode active material A1 was analyzed through powder X-ray diffraction by using a powder X-ray diffractometer (trade name "RINT2200" from Rigaku Corporation, Cu-Kα). Measurements were performed in 2 Theta/Theta continuous scan mode from 15° to 120° at a step of 0.02° and a rate of 4°/min. Other settings were measurement voltage/current of 40 kV/40 mA, divergence slit at 1°, scattering slit at 1°, receiving slit of 0.3 mm, and without monochromator receiving slit. As the result of the analysis, the crystal structure of the positive electrode active material A1 was determined to be a layered rock-salt structure belonging to space group R-3m.

The positive electrode active material A1 and a thermosetting resin were mixed, and the resin was cured. The obtained cured product underwent mechanical polishing, and then finish sectional processing by a cross section polisher (CP) method, and the resulting polished surface was observed under a SIM at a magnification of 1,000× to 10,000×. FIG. 1 shows a SIM observation image of the section of the positive electrode active material A1. As is clear from the sectional observation image of FIG. 1, the positive electrode active material A1 was composed of secondary particles formed of aggregated primary particles. A porosity (area ratio) of the positive electrode active material A1 was calculated through color-coding of void portions and the rest portions of the obtained sectional observation image of the positive electrode active material A1 by using Image-Pro PLUS image analysis software (from Media Cybernetics, Inc.). The porosity of the positive electrode active material A1 was 0% (equal to or lower than the detection limit). Further, an average number of primary particles contained in secondary particles, whose diameter is converted to be 8 μm, was measured in accordance with the above-described method in the sectional observation image of the positive electrode active material A1. As the result, the average number of primary particles was 13,000.

A compressive fracture strength (St) of the positive electrode active material A1 was measured. The measurement of the compressive fracture strength was performed for five particles of the positive electrode active material A1 having a particle size of about 8 μm (8 μm±≤5%) under measurement conditions described hereinafter. An average of the obtained measurement values was regarded as the compressive fracture strength of the positive electrode active material A1. The compressive fracture strength of the positive electrode active material A1 was 215 MPa.

<Measurement Conditions>

Test temperature: ambient temperature (25° C.)

Testing apparatus: micro compression tester, model name

"MCT-W201" from Shimadzu Corporation
Upper indenter: 50 µm-diameter plane
Measurement mode: compression test
Test load: 90 mN
Loading rate: 2.6478 mN/s

[Manufacture of Positive Electrode]

The prepared positive electrode active material A1 as a positive electrode active material, acetylene black as a conductive agent, and polyvinylidene fluoride as a binder were mixed in amounts of 91 parts by mass, 7 parts by mass, and 2 parts by mass, respectively. The resulting mixture was kneaded by using a kneader (T.K. HIVIS MIX from Primix Corporation) to yield a positive electrode mixture slurry. An electrode (positive electrode) was manufactured by applying the positive electrode mixture slurry to a 15 µm-thick aluminum foil and drying the coating so as to form a positive electrode mixture layer on the aluminum foil.

[Preparation of Nonaqueous Electrolyte]

Ethylene carbonate (EC), methyl ethyl carbonate (MEC), and dimethyl carbonate (DMC) were mixed in a volume ratio of 3:3:4. A nonaqueous electrolyte was prepared by dissolving lithium hexafluorophosphate ($LiPF_6$) in the mixed solvent so as to show the concentration of 1.2 mol/L.

[Manufacture of Test Cell]

A rolled electrode assembly was manufactured by stacking the above-described positive electrode and a negative electrode formed of a lithium metal foil so as to face each other with a separator in between and then rolling the stacked product. Subsequently, a nonaqueous electrolyte secondary battery (test cell A1) was manufactured by placing the rolled electrode assembly and the nonaqueous electrolyte inside a case.

Example 2

In the preparation of a positive electrode active material, a positive electrode active material A2 was prepared in a similar manner to Example 1 except for adding SiO in an amount of 0.1 mass % as Si relative to the expected composition of the positive electrode active material ($Li_{1.03}Ni_{0.88}Co_{0.09}Al_{0.03}O_2$) to the mixture of LiOH and NiCoAl complex oxide. A nonaqueous electrolyte secondary battery (test cell A2) was manufactured in a similar manner to Example 1 by using the positive electrode active material A2.

The positive electrode active material A2 was represented by a composition formula of $Li_{1.03}Ni_{0.88}Co_{0.09}Al_{0.03}O_2$, and the content of Si was 0.08 mass % relative to the positive electrode active material A2. As the result of analysis by powder X-ray diffraction, the crystal structure of the positive electrode active material A2 was determined to be a layered rock-salt structure belonging to space group R-3m. As the result of sectional observation using a SIM, the positive electrode active material A2 was composed of secondary particles formed of aggregated primary particles and had a porosity of 0.6% and an average number of primary particles contained in secondary particles (converted as diameter of 8 µm) of 15,600. The compressive fracture strength of the positive electrode active material A2 was 145 MPa.

Comparative Example 1

In the preparation of a positive electrode active material, a positive electrode active material B1 was prepared in a similar manner to Example 1 except for eliminating the addition of SiO to the mixture of LiOH and NiCoAl complex oxide. A nonaqueous electrolyte secondary battery (test cell B1) was manufactured in a similar manner to Example 1 by using the positive electrode active material B1.

The positive electrode active material B1 was represented by a composition formula of $Li_{1.03}Ni_{0.88}Co_{0.09}Al_{0.03}O_2$, and the content of Si was 0 mass % (equal to or lower than the detection limit) relative to the positive electrode active material B1. As the result of analysis by powder X-ray diffraction, the crystal structure of the positive electrode active material B1 was determined to be a layered rock-salt structure belonging to space group R-3m. As the result of sectional observation using a SIM, the positive electrode active material B1 was composed of secondary particles formed of aggregated primary particles and had a porosity of 1.94% and an average number of primary particles contained in secondary particles (converted as diameter of 8 µm) of 6,000. The compressive fracture strength of the positive electrode active material B1 was 114 MPa.

Comparative Example 2

In the preparation of a positive electrode active material, a positive electrode active material B2 was prepared in a similar manner to Example 1 except for adding KOH, rather than SiO, in an amount of 10 mass % relative to the expected composition of a positive electrode active material ($Li_{1.03}Ni_{0.88}Co_{0.09}Al_{0.03}O_2$) to the mixture of LiOH and NiCoAl complex oxide, and removing KOH attached to particle surfaces after calcination through washing with water. A nonaqueous electrolyte secondary battery (test cell B2) was manufactured in a similar manner to Example 1 by using the positive electrode active material B2.

The positive electrode active material B2 was represented by a composition formula of $Li_{1.03}Ni_{0.88}Co_{0.09}Al_{0.03}O_2$, and the content of Si was 0 mass % (equal to or lower than the detection limit) relative to the positive electrode active material B2. As the result of analysis by powder X-ray diffraction, the crystal structure of the positive electrode active material B2 was determined to be a layered rock-salt structure belonging to space group R-3m. As the result of sectional observation using a SIM, the positive electrode active material B2 was composed of secondary particles formed of aggregated primary particles and had a porosity of 0% (equal to or lower than the detection limit) and an average number of primary particles contained in secondary particles (converted as diameter of 8 µm) of 4. The compressive fracture strength of the positive electrode active material B2 was 210 MPa.

Comparative Example 3

In the preparation of a positive electrode active material, a positive electrode active material B3 was prepared in a similar manner to Example 1 except for adding SiO in an amount of 0.7 mass % as Si relative to the expected composition of the positive electrode active material ($Li_{1.03}Ni_{0.88}Co_{0.09}Al_{0.03}O_2$) to the mixture of LiOH and NiCoAl complex oxide. A nonaqueous electrolyte secondary battery (test cell B3) was manufactured in a similar manner to Example 1 by using the positive electrode active material B3.

The positive electrode active material B3 was represented by a composition formula of $Li_{1.03}Ni_{0.88}Co_{0.09}Al_{0.03}O_2$, and the content of Si was 0.69 mass % relative to the positive electrode active material B3. As the result of analysis by powder X-ray diffraction, the crystal structure of the positive electrode active material B3 was determined to be a layered rock-salt structure belonging to space group R-3m. As the result of sectional observation using a SIM, the positive electrode active material B3 was composed of secondary particles formed of aggregated primary particles and had a porosity of 0% (equal to or lower than the detection limit) and an average number of primary particles contained in secondary particles (converted as diameter of 8 μm) of 64,000. The compressive fracture strength of the positive electrode active material B3 was 199 MPa.

[Output Characteristics Test]

At a temperature of 25° C., each test cell manufactured as described above was charged at a constant current of a current value of 0.2It to a voltage of 4.3 V, and then charged at a constant voltage of 4.3 V to a current value of 0.01It. Subsequently, each cell was discharged with a discharge cutoff voltage of 2.5 V at a constant current of each current value of 1It, 0.5It, 0.2It, 0.1It, 0.05It, and 0.01It in this order. The potential of a positive electrode active material was determined in a short period of time by performing constant-current discharge at gradually lowered current values as described above. A total discharge capacity of a test cell to the constant-current discharge at a current value of 0.05It was set to be an initial discharge capacity for each test cell.

Next, each test cell underwent charge/discharge cycles repeatedly under the following conditions. The environmental temperature during charging/discharging was set to 25° C. First, constant-current charging was performed at a current value of 0.2It to a voltage of 4.3 V, and then constant-voltage charging was performed at 4.3 V to a current value of about 0.01It. Subsequently, constant-current discharging with a discharge cutoff voltage of 2.5 V was performed at a current value of 0.2It. A 20 minute-rest time was each set between charging and discharging. Such a charge/discharge cycle was set as one cycle, a similar test to the initial charging/discharging was performed in every 10 cycles, and 40 cycles were performed by repeating the above procedure four times. A ratio (percentage) of a discharge capacity in the twentieth cycle or the fortieth cycle to the initial discharge capacity was calculated as a capacity retention rate. In terms of such capacity retention rates in the twentieth cycle and in the fortieth cycle, durability (cycle characteristics) of each test cell was evaluated.

Table 1 shows silicon content, porosity, compressive fracture strength, and average number of primary particles contained in secondary particles (converted as diameter of 8 μm) for each positive electrode active material prepared in the respective Examples and Comparative Examples, and capacity retention rate (in twentieth cycle and in fortieth cycle) of each test cell.

TABLE 1

| | Si content (mass %) | Porosity (%) | Compressive fracture strength (MPa) | Average number of primary particles (as 8 μm) | Capacity retention rate (%) 20th cycle | Capacity retention rate (%) 40th cycle |
|---|---|---|---|---|---|---|
| Ex. 1 | 0.19 | 0 | 215 | 13,000 | 99.1 | 99.1 |
| Ex. 2 | 0.08 | 0.6 | 145 | 15,600 | 99.0 | 98.2 |
| Comp. Ex. 1 | 0 | 1.94 | 114 | 6,000 | 97.3 | 93.5 |
| Comp. Ex. 2 | 0 | 0 | 210 | 4 | 97.8 | — |
| Comp. Ex. 3 | 0.69 | 0 | 199 | 64,000 | 94.9 | 88.1 |

FIGS. 1 to 5 show the respective SIM observation images of the sections of positive electrode active materials A1, A2, and B1 to B3.

As is clear from Table 1, test cells A1 and A2 of Examples 1 and 2, in which the positive electrode active material contained silicon, exhibited extremely high capacity retention rates compared with test cells B1 and B2 of Comparative Examples 1 and 2, in which the positive electrode active material did not contain silicon. It is believed that the presence of silicon in the positive electrode active material decreases stress inside the respective secondary particles, thereby suppressing cracking, breakage, or the like of the positive electrode active material.

Meanwhile, the test cell of Comparative Example 3, in which the positive electrode active material had high silicon content, exhibited low capacity retention rates. It is believed that the excessive silicon content in the positive electrode active material B3 of Comparative Example 3 causes structural destabilization.

As in the foregoing, by incorporating silicon in a specific range and setting a porosity inside a positive electrode active material to low, a positive electrode active material according to the embodiment enables the manufacture of a nonaqueous electrolyte secondary battery having markedly excellent durability.

INDUSTRIAL APPLICABILITY

The present invention is applicable to a positive electrode active material for a nonaqueous electrolyte secondary battery and to a nonaqueous electrolyte secondary battery.

The invention claimed is:

1. A positive electrode active material for a nonaqueous electrolyte secondary battery, comprising
   silicon and lithium nickel complex oxide having a layered rock-salt structure, the positive electrode active material being composed of secondary particles formed of aggregated primary particles, wherein
   the lithium nickel complex oxide contains 85 mol % or more and 95 mol % or less of nickel, based on a total amount of a metal excluding lithium,
   silicon content is 0.6 mass % or less based on a total amount of the positive electrode active material, and
   a porosity of the positive electrode active material is 0% or more and 1% or less.

2. The positive electrode active material for a nonaqueous electrolyte secondary battery according to claim 1, wherein a compressive fracture strength is 130 MPa or higher and 230 MPa or lower.

3. The positive electrode active material for a nonaqueous electrolyte secondary battery according to claim 1, wherein an average number of the primary particles contained in the secondary particles, whose diameter is converted to be 8 is 10,000 or more.

4. A nonaqueous electrolyte secondary battery comprising a positive electrode containing the positive electrode active material for a nonaqueous electrolyte secondary battery according to claim 1, a negative electrode, and a nonaqueous electrolyte.

5. The positive electrode active material for a nonaqueous electrolyte secondary battery according to claim 1, wherein the silicon is dissolved in the lithium nickel complex oxide.

* * * * *